United States Patent
Dorricott

Patent Number: 6,125,209
Date of Patent: Sep. 26, 2000

[54] DATABASE ACCESSING METHOD AND APPARATUS

[75] Inventor: Martin Rex Dorricott, Basingstoke, United Kingdom

[73] Assignee: Sony United Kingdom Limited, Weybridge, United Kingdom

[21] Appl. No.: 09/053,565

[22] Filed: Apr. 1, 1998

[30] Foreign Application Priority Data

Apr. 4, 1997 [GB] United Kingdom .................. 9706821

[51] Int. Cl.[7] .................................................. G06F 17/30
[52] U.S. Cl. ........................ 382/233; 382/181; 382/209; 707/100
[58] Field of Search ...................... 707/1–10, 100–104, 707/200–206; 705/44, 45; 382/233, 181, 190, 203, 209

[56] References Cited

U.S. PATENT DOCUMENTS

| | | | |
|---|---|---|---|
| 4,899,292 | 2/1990 | Montagna et al. | 707/501 |
| 5,710,835 | 1/1998 | Bradley | 382/233 |
| 5,813,009 | 9/1998 | Johnson et al. | 707/100 |
| 5,870,725 | 2/1999 | Bellinger et al. | 705/45 |
| 5,901,246 | 5/1999 | Hoffberg et al. | 382/209 |
| 5,920,477 | 7/1999 | Hoffberg et al. | 382/181 |

FOREIGN PATENT DOCUMENTS

WO 90/13089  11/1990  WIPO .
WO 93/17393  9/1993  WIPO .

*Primary Examiner*—Ruay Lian Ho
*Attorney, Agent, or Firm*—Frommer Lawrence & Haug, LLP.; William S. Frommer; Joe H. Shallenburger

[57] ABSTRACT

Apparatus for accessing a database having database records comprising data-compressed image data comprises a database server apparatus operable to respond to a database query by returning database records to the client process matching the criteria specified by the database query; and a client process for issuing database queries to the database server and for displaying information indicative of the database records returned by the database server apparatus; in which: the client process has a data decompressor for decompressing data-compressed images received from the database server and a data cache for storing decompressed image data representing those images; the client process is operable to retrieve, decompress, display and store in the data cache data-compressed a subset of the images relating to the database records returned by the database server; and the client process is then operable to retrieve, decompress and store in the data cache data-compressed images relating to the database records returned by the database server but not currently required for display.

4 Claims, 2 Drawing Sheets

DATABASE ACCESSING METHOD AND APPARATUS

BACKGROUND OF THE INVENTION

1. Field of the Invention

This invention relates to methods and apparatus for accessing databases, particularly databases having database records including image data.

2. Description of the Prior Art

When a database is accessed, a typical arrangement is that a "query" or search statement is passed to the database, and in response the database returns details of any "hits"—i.e. those database entries or records matching the criteria specified in that query.

Some databases have records containing image data. An example is a video archiving database, where single images or "picture stamps" characterising the whole of an archived video clip can be stored in a database alongside textual comments and keywords relating to that clip. When the database responds to a user query, the user can be presented with a scrollable display of the images and the textual information, enabling the user to identify a desired database record quickly.

However, when the database records contain image data, this response from the database can represent a large amount of data to be transferred to the client application or client computer making the query. This is because digitised images generally contain a large amount of data in comparison to textual information.

This large amount of data to be transferred can be acceptable when the querying application and the database are resident on the same host computer, but when they are resident on separate machines linked, for example, by a bandwidth-limited network connection such as an ethernet link, transferring such large amounts of data can become a problem. The problem is made worse in situations where the database can be accessed by multiple client computers, or in which the network is already heavily loaded with other data traffic.

One apparent way of alleviating this problem of slow transfer of the digitised images would be to compress those images using a compression technique such as the known JPEG technique. However, any delay in transferring the images to the client making the database query is then added to by the time required to decompress the images before they can be displayed. In the scrolling system described above, such delays can be subjectively very disturbing to the user.

SUMMARY OF THE INVENTION

This invention provides apparatus for accessing a database having database records comprising data-compressed image data, the apparatus comprising:
- a database server apparatus operable to respond to a database query by returning database records to the client process matching the criteria specified by the database query; and
- a client process for issuing database queries to the database server and for displaying information indicative of the database records returned by the database server apparatus;

in which:
- the client process has a data decompressor for decompressing data-compressed images received from the database server and a data cache for storing decompressed image data representing those images;
- the client process is operable to retrieve, decompress, display and store in the data cache data-compressed a subset of the images relating to the database records returned by the database server; and
- the client process is then operable to retrieve, decompress and store in the data cache data-compressed images relating to the database records returned by the database server but not currently required for display.

The invention addresses the problems described above by providing a cache store of the decompressed image data at the client workstation. So, in addition to images required for current display to the user, other images relating to, for example, other database "hits" under the current query or to more detail of the currently displayed hits.

This arrangement of locally caching decompressed images can reduce the delay between a user command and the display of a corresponding image (assuming it is cached) and so avoid or reduce the subjective delays described above.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
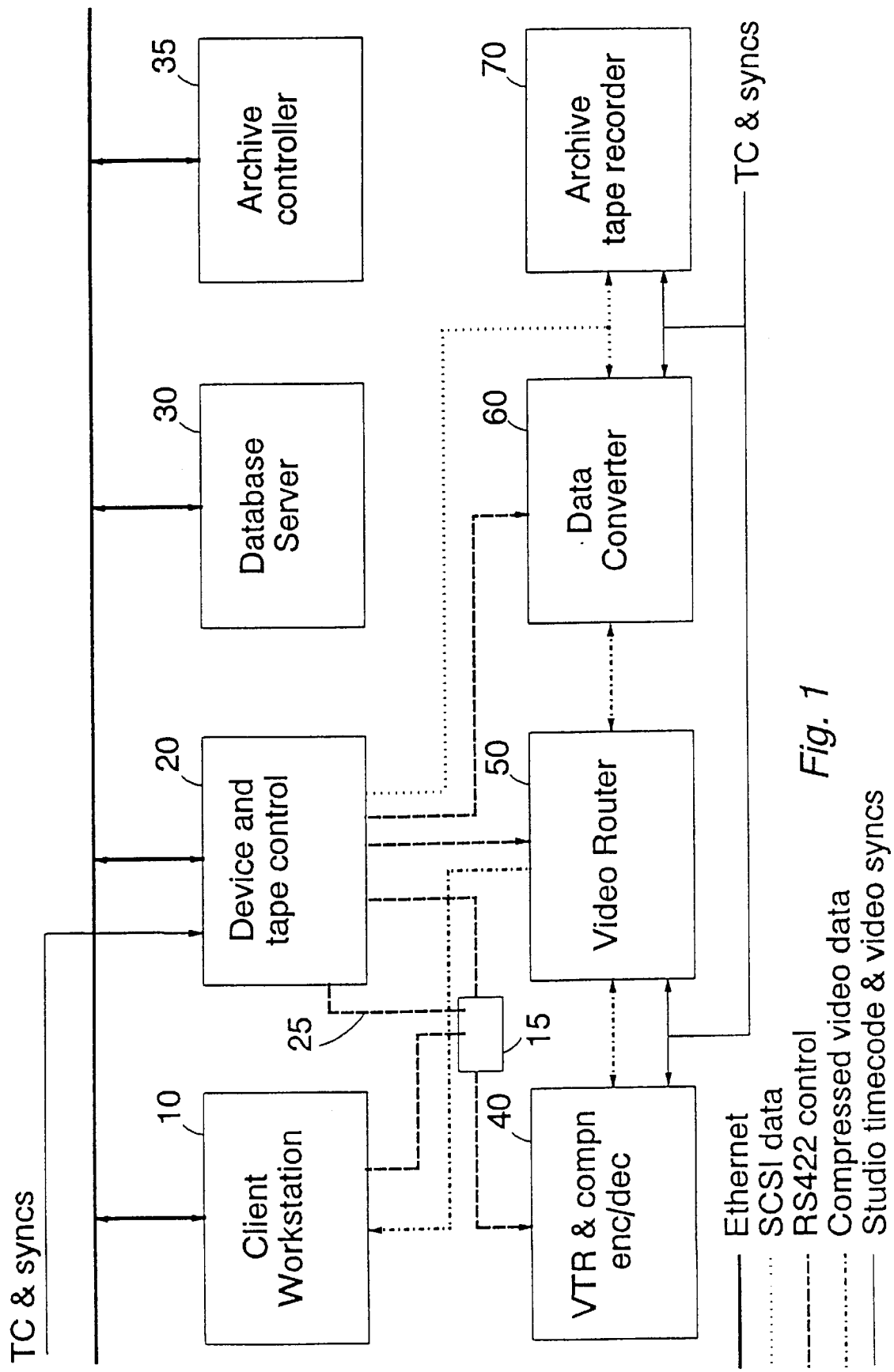
FIG. 1 is a schematic diagram of a video archiving system.

FIG. 1 is a schematic diagram of a video archiving system.

The system comprises an client workstation 10, a device and tape control computer 20, a database server 30 and an archive controller 35, all linked by an ethernet local area network (LAN) connection, an RS-422 router 15, a video tape recorder (VTR) 40, a video (and audio) router 50, a data converter 60 and an archive tape recorder 70.

The archive controller 35 controls and coordinates the overall operation of the device and tape controller 20, and communicates with the database server (to consult or modify the database held on that server) and with the client workstation (to receive commands).

The database server holds a database of the archived material (see below). The device and tape controller 20 responds to commands issued by the archive controller to generate specific RS-422 or SCSI commands to drive the controlled devices 40, 50, 60, 70 (and possibly other similar devices—not shown).

The RS-422 router is operable to route RS-422 commands to the VTR from either the device and tape controller 20 or the client workstation 10.

Finally, each client workstation is available for use by a human archivist in preparing material for archive and corresponding entries in the database and for browsing through and retrieving database entries or records. The client workstations are in effect the "client", in that they communicate high level archiving tasks to the archive controller, which then schedules and carries out those tasks—e.g. by instructing the device and tape controller 20.

The archiving system works in two main modes of operation. When incoming video material (with or without accompanying audio material) is to be archived, the material is replayed from the VTR 40 and viewed at the client workstation 10. A human operator (referred to as the archivist) then assigns a title, various keywords, an abstract and other information to the video material. This additional information forms a database entry which is stored in a database maintained on the database server 30. In the meantime, the video material is stored on the archive tape recorder 70. This "archive creation" process will be described in more detail below.

In a second ("archive retrieval") process, the human operator uses the client workstation 10 (or another client workstation connected to the network) to browse through the database entries held on the database server 30. For example, the user might be searching for video material having a particular associated keyword. When the user finds one or more pieces of video material in this manner which he believes are appropriate to the current requirements, he can schedule a retrieval operation to retrieve that video material from the archive tape recorder.

These two processes will now be described in more detail.

Archive Creation

In this mode of operation, incoming video material is replayed from the VTR (for example, a Sony Digital Beta-Cam video tape recorder) and is encoded into a known compressed video format (the so-called MPEG II 4:2:2 P@ML format). The compressed video is supplied in a known data transmission format known as "SDDI" via the router 50 to the client workstation 10, where it can be viewed by the archivist.

At this archive creation stage, the routing applied by the video router 50 is controlled by the device and tape control computer 20, which in turn responds to commands by the client workstation 10. However, for rapid control by the human operator, the RS-422 commands which control the VTR 40 are routed, via the RS-422 router, directly from the client workstation 10 to the VTR 40. So, as a first step, the device and tape controller 20 uses an RS-422 control line 25 to set up the RS-422 router to patch RS-422 commands from the client workstation to the VTR, and from then on during the archive creation process the commands are passed directly. Thus, if the archivist wishes to replay a particular portion of the tape, he makes the appropriate commands at the client workstation 10, which are communicated via RS-422 router to the VTR 40 using a conventional RS-422 control protocol.

The archivist replays through the material to be archived, perhaps several times over to gain a full understanding and familiarity with the events covered by the video material. The archivist is presented with software-generated database entry forms on the screen of the client workstation 10, at which the archivist can enter information to be used in classifying that video material. The archivist can also select individual frames from the material to act as "picture stamps", to be stored in the database record as images particularly characterising that video material or a camera shot within the video material. These items of information together form a database entry to be added to a conventional database maintained on the database server 30.

When the database entry has been prepared and stored, the video material is transferred from the VTR 40, via the router 50 to the data converter 60. In doing this, the archive controller instructs the device and tape controller to set up the relevant devices, including setting up the RS-422 router now to route RS-422 commands from the device and tape controller to that VTR, and then to issue the necessary operating commands to set the VTR into play mode and the archive tape recorder into a record mode. The data converter 60 receives the video data in the SDDI synchronous transmission format and outputs the video data to the archive tape recorder 70 in a SCSI data transfer format.

Because the nature of the SCSI transmission format does not tend to allow data transfer operations to be initiated and started quickly enough for a synchronous video data transfer, the data converter 60 contains a large buffer memory (not shown) to provide any necessary delay to the data being passed to or from the data converter 60.

The archive tape recorder itself is a helical scan digital tape recorder such as the Sony GY10 tape recorder. This device is primarily a "data" recorder, and so will accept data other than video data, but it is noted that in this embodiment the bulk of the material stored on the archive tape recorder is in fact video data.

The video data and certain other data is then recorded on the archive tape recorder 70. Specifically, the video data is routed as described above from the VTR 40, via the router 50 to the data converter 60 and finally to the archive tape recorder 70; and the other associated data (e.g data derived from the database entry for that material) is routed from the database server 30 to the device and tape controller 20 via the LAN, and then from the device controller 20 to the archive tape recorder 70 via the SCSI link.

In a typical application, there is a very large amount of video data to be archived in this way, so a robotic library system may be used in associated with the archive tape recorder 70. In any event, whether a robotic or a manual library system is used, it is very likely that a large number of tapes will be required, and so the database entry for the video material archived on a particular tape (which is stored in the database server 30) also contains a tape identifier which identifies the appropriate tape (or tapes, if multiple copies are made) on which that material is stored.

Archive Retrieval

The first step in an archive retrieval operation is to identify the appropriate piece of video material to be retrieved. The user can do this by browsing through the database stored on the database server 30 from a computer workstation (such as the client workstation 10) connected via the ethernet link to the database server 30. This searching mechanism may be conventional, using key words, title information or abstract text to search for a required piece of video material. The search or query process is described in more detail below.

Once the required material has been identified, the user can issue a command which is transmitted via the ethernet link to the archive controller, which in turn issues a command to the device and tape control computer 20 to retrieve the required video data from the archive tape recorder 70. Again, executing these commands will include setting up the SCSI link between the archive tape recorder and the data converter, setting up the RS-422 links between the other devices, and issuing correctly timed commands to initiate play and record modes of the devices.

In general, in a typical system these commands will have to be queued by the archive controller and then initiated and executed in a priority order.

When a command is executed to retrieve data from the archive tape recorder, it is first necessary to have the correct tape placed in the archive tape recorder 70 (e.g. by the robotic library system—not shown). Then, the device and tape control computer 20 sets up the SCSI link from the archive tape recorder to the data converter and issues appropriate RS-422 commands to the data converter, the router and the VTRs 40 so that the video data is replayed from the archive tape recorder 70, communicated via the SCSI link to the data converter 60, converted into an SDDI synchronous transmission format, and then supplied via the router 50 to the VTR 40 for recording. The material can then be viewed, either during this process or later from the VTR, at one of the computer workstations.

Thus, in the example operation described above, it may be necessary to issue RS-422 commands simultaneously to the data converter, the router and to the VTRs. As well as the requirement for issuing the commands simultaneously, a more onerous requirement is that the commands often have to be timed at sub-field accuracy with respect to an external source of video syncs. This requirement can arise during an archive creation process when an incoming video signal from another part of the studio is to be archived, or during an archive retrieval process when an archived section of video material has to be retrieved at a particular time for recording or transmission elsewhere in the studio.

The servers and controllers (i.e. the device and tape controller 20, the database server 30 and the archive controller 35) used in the apparatus of FIG. 1 are standard PC-compatible general purpose computers, operating under the Microsoft Windows NT operating system (for the database server 30 and the archive controller 35) or the QNX real-time operating system available from the QSSL company (for the device and tape controller 20). These operating systems allow message-driven multitasking within each server between multiple concurrent processing tasks, which provides efficient use of the server's processing capacity. However, this does mean that the time at which a particular operation takes place is not generally predictable to the accuracy of a fraction of a video frame period required for issuing control commands to the controlled video devices 40, 50, 60.

Figure 2:
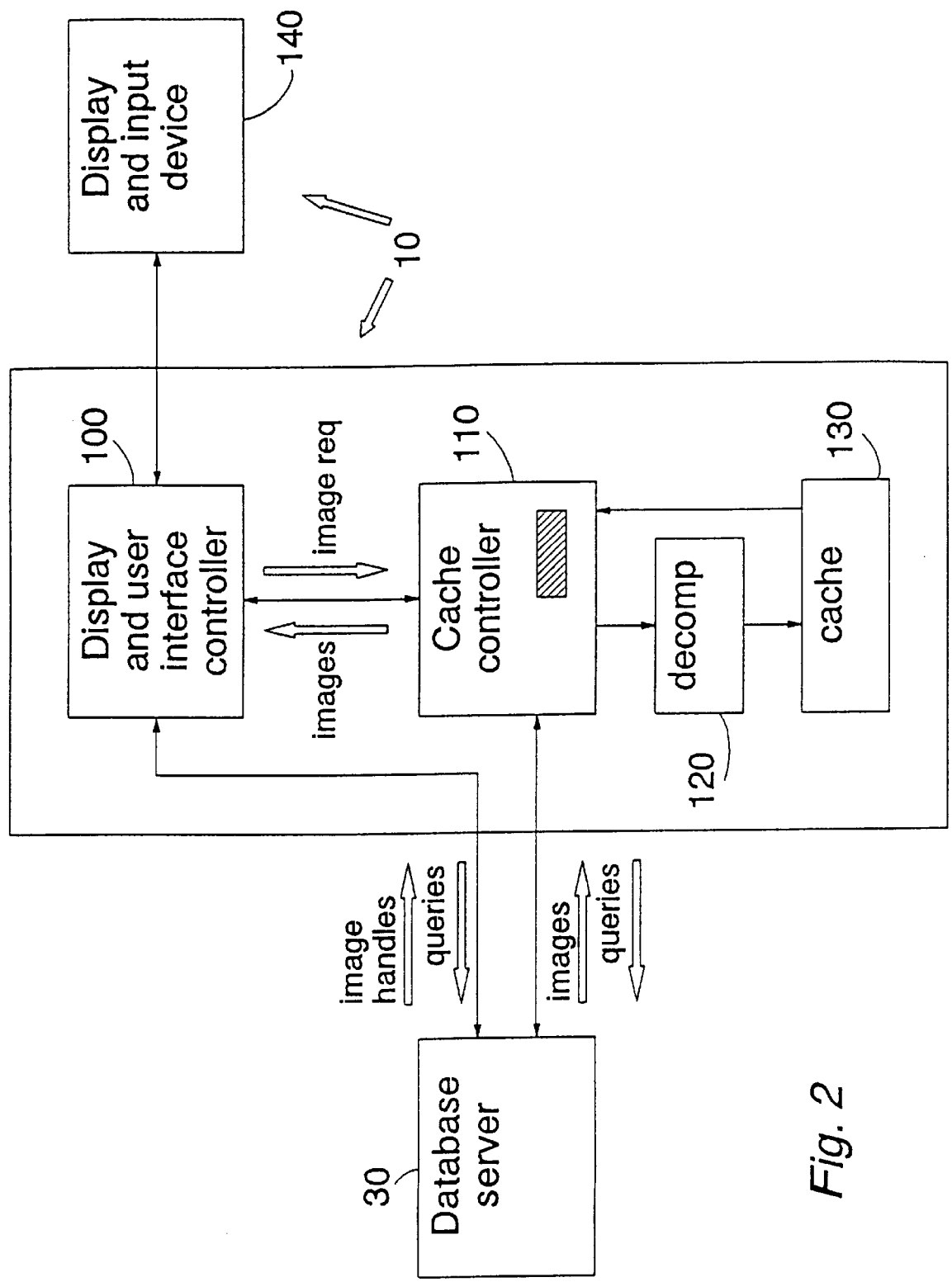
FIG. 2 is a schematic diagram of a client workstation in the system of FIG. 1.

FIG. 2 is a schematic diagram showing the operation of the client workstation 10 when involved in a database browsing operation.

The client workstation 10 comprises a display and user interface controller 100, a cache controller 110, a data decompression device 120, a cache storage device 130 and a display and input device 140 (e.g. a computer keyboard and a computer display screen).

At the start of the database browsing operation, the display and user interface controller 100 sends a user query to the database server 30. This is a standard database accessing technique: the query might be a keyword for comparison with an abstract associated with video material held on the database server 30, a time period (e.g. "find all material originated between 1 and 3 March 1997"), a subject reference or similar. In response, the database returns details of a number of database "hits"— i.e. database records complying with the search criteria set out in the query— together with image "handles" corresponding to those database hits.

The image handles are pointers to image data stored in the database representing picture stamps associated with the database entries. Digitally storing an image, even using data compression, generally requires significant amounts of data to be stored. If all this data was returned to the display and user interface controller 100 in response to a database query, there could be a significant delay involved. This is why only the image "handles" or pointers are returned to the display and user interface controller, as the image handles occupy very much less data than a complete image.

The display and user interface controller selects those images which it requires immediately for display in the currently selected output format on the display device and sends an image request to the cache controller 110. The cache controller 110 checks in a cache register 115 whether the required images are held in the cache 130 and, if not, issues a query back to the database server 130 to obtain the required image data. The image data is returned to the cache controller.

The image data is in a compressed form, and so the cache controller passes the compressed image data it receives from the database to the decompression device 120, with the decompressed data being stored in the cache 130. The decompressed image data for the currently-required images is also returned via the cache controller to the display and user interface controller 100 for display on the display and input device 140.

Once the immediate needs of the display and user interface controller have been addressed in this way, the display and user interface controller then initiates the downloading and decompression of other images relating to the same database search. An example of this process is given below, but in general terms the operation is as above, in that the display and user interface controller 100 issues further requests to the cache controller for images to be cached (but not immediately supplied back to the display and user interface controller). The cache controller requests those images from the database server 30 and, after decompression by the decompression device 120, stores them in the cache 130. The cache controller also updates the cache register 115 with details of the newly cached images.

EXAMPLE

In the example, the database stored on the database server 30 has database records each having the following format:

| Main text description of archived video material clip | text relating to sub-section 1 | text relating to sub-section 2 | . . . | text relating to sub-section 4 |
|---|---|---|---|---|
| Main picture stamp characteristing entire clip | picture stamp characteristing sub-section 1 | picture stamp characteristing sub-section 2 | . . . | picture stamp characteristing sub-section 4 |

In this format, the database record corresponding to a material clip includes an overall description and an overall ("main") characterising picture stamp. Then individual sub-sections of the material—perhaps different camera shots within the material—are provided with individual descriptions and picture stamps.

Assume that the user carries out a search which uncovers 12 records as database "hits"—i.e. there are 12 records which comply with the criteria specified in the search query.

At an initial level, the user might want to see only the main picture stamp and the overall description from each record.

If this information form all 12 database hits can be displayed simultaneously, then the display and user interface controller would request the cache controller to obtain and decompress the image data from all 12 main picture stamps straight away.

However, if all 12 records cannot fit onto the display screen at once, they can be presented in a scrollable format so that a subset of the records is visible at any time. In this case, the display and user interface controller would first request the cache controller to obtain and decompress the subset of the 12 main images for immediate display, and then would request the cache controller to obtain and decompress the remaining ones of the 12 main images to allow a smooth and rapid scroll through the set of 12 hits. For example, if information relating to four hits can be displayed at a time, the display and user interface controller would initiate retrieval, decompression and caching of the main picture stamps for the first four records (for immediate display), and would then initiate retrieval, decompression and caching of the remaining eight main picture stamps.

Once the "main" images relating to the database hits have been retrieved and decompressed in this way, the display and user interface controller instructs the cache controller to obtain and decompress the images relating to sub-sections of each database hit. This operation is in anticipation of a request by the user to look in more detail at one of the database records which came up as a hit in the search. So, if and when the user does make such a request, the intention of this arrangement is that the required picture stamp images for the sub-sections of that record will by then have been retrieved from the database, decompressed and stored in the cache 130.

At all stages, the cache controller 110 maintains the cache register indicating which images are cached in the cache 130, together with a time at which the images were cached.

The cache is capable of holding a particular number of decompressed images—for example, in this embodiment 100 images can be cached. When a new image is to be cached in a cache 130 which is already full, then the oldest cached image is discarded unless that image relates to a record currently under examination by the user.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for accessing a database having database records comprising data-compressed image data, said apparatus comprising:

(i) a database server apparatus operable to respond to a database query by returning database records to the client process matching the criteria specified by said database query; and (ii) a client process for issuing database queries to said database server and for displaying information indicative of said database records returned by said database server apparatus;

in which:

(i) said client process has a data decompressor for decompressing data-compressed images received from said database server and a data cache for storing decompressed image data representing those images;

(ii) said client process is operable to retrieve, decompress, display and store in said data cache a data-compressed subset of said images required for display relating to said database records returned by said database server; and (iii) said client process is then operable to retrieve, decompress and store in said data cache data-compressed images relating to said database records returned by said database server but not currently required for display.

2. Apparatus according to claim 1, in which said client process runs on a client data processing apparatus different to said database server apparatus, said client data processing apparatus being connected to transfer data to and from said database server apparatus by a data communication link.

3. Apparatus according to claim 1, in which said database records comprise a main image characterising said record and one or more sub-images characterising sub-sections of said record, said client process being operable to retrieve, decompress and store in said data cache said data-compressed main images relating to said database records returned by said database server but not currently required for display, and then to retrieve, decompress and store in said data cache said data-compressed sub-images relating to said database records returned by said database server.

4. Apparatus according to claim 1, in which, when said data cache has been filled with image data, said client process is operable to overwrite the earliest-stored image in said data cache to store a newly retrieved and decompressed image, unless that earliest-stored image relates to a database record currently being displayed.

* * * * *